United States Patent
Oksala et al.

(10) Patent No.: US 7,308,054 B2
(45) Date of Patent: Dec. 11, 2007

(54) DETERMINATION OF A REFERENCE VALUE FOR AUTOMATIC GAIN CONTROL OF A RECEIVER ON A GENERAL PACKET CONTROL CHANNEL

(75) Inventors: Jarkko Oksala, Tampere (FI); Jari Ruohonen, Tampere (FI); Kent Pedersen, Frederiksberg (DK)

(73) Assignee: Nokia Corporation, Espoo (FI)

( * ) Notice: Subject to any disclaimer, the term of this patent is extended or adjusted under 35 U.S.C. 154(b) by 816 days.

(21) Appl. No.: 10/090,927

(22) Filed: Mar. 4, 2002

(65) Prior Publication Data

US 2002/0122513 A1 Sep. 5, 2002

(30) Foreign Application Priority Data

Mar. 5, 2001 (FI) .................................. 20010438

(51) Int. Cl.
*H04L 27/08* (2006.01)
(52) U.S. Cl. ...................................... 375/345
(58) Field of Classification Search ................ 375/317, 375/345; 455/232.1, 245.1, 240.1, 250.1
See application file for complete search history.

(56) References Cited

U.S. PATENT DOCUMENTS 5,331,638 A * 7/1994 Honkasalo et al. ......... 370/347
5,758,271 A * 5/1998 Rich et al. ................ 455/234.1
6,496,551 B1 * 12/2002 Dam et al. .................. 375/347
6,603,825 B1 * 8/2003 Pecen .......................... 375/345

FOREIGN PATENT DOCUMENTS

| EP | 0411756 | 2/1991 |
|---|---|---|
| EP | 0496507 | 7/1992 |
| EP | 0725479 | 8/1996 |
| WO | 99/34506 | 7/1999 |
| WO | 0049727 | 8/2000 |

* cited by examiner

*Primary Examiner*—Khanh C. Tran

(57) ABSTRACT

A device and a method for determining a reference level for automatic gain control of a radio frequency signal to be received, particularly having a varying strength, in which method frames of a logical general packet control channel are received, as well as frames which have been transmitted with a predetermined transmission power level and by using a predetermined way of controlling the transmission power level. In the invention, said reference level is determined on the basis of at least one frame of a received radio block, or on the basis of at least one preceding frame, or on the basis of both of these, wherein the reference level is corrected on the basis of the signal strength measured during their reception.

21 Claims, 2 Drawing Sheets

DETERMINATION OF A REFERENCE VALUE FOR AUTOMATIC GAIN CONTROL OF A RECEIVER ON A GENERAL PACKET CONTROL CHANNEL

TECHNICAL FIELD

The present invention relates to a method for determining a reference level for automatic gain control of a radio frequency signal to be received, particularly having a varying strength. The invention relates to device for determining a reference level for automatic gain control of a radio frequency signal to be received, particularly having a varying strength.

BACKGROUND ART

A wireless communication system generally refers to a communication system which makes a wireless data transmission connection possible between a wireless communication device (MS, mobile station) and stationary parts of the system, when the user of the wireless communication device moves within the operating range of the system. A typical system is a public land mobile network PLMN. A majority of wireless communication systems belongs to so-called second-generation mobile communication systems, of which an example to be mentioned is the widely known circuit switched GSM mobile communication system (Global System for Mobile Telecommunications). The present invention is particularly suitable for mobile communication systems under development. As an example of such a communication system, in this description, the GPRS system (General Packet Radio Service) will be used, which is presently under development. It is obvious that the invention can also be applied in other systems which are based on packet systems, such as the GPRS system, or which utilize it (UMTS, Universal Mobile Telecommunication System).

In modern general mobile communication networks based on a cellular system, the system consists, in a known way, of several mobile stations (MS) applying the system, such as mobile phones, and a stationary base station subsystem (BSS). This base station subsystem normally consists of several base transceiver stations (BTS) distributed over a geographical area, and each base station serves a cell which consists of at least a part of this geographical area.

For example, in the GSM system, communication between communication devices, such as a mobile station and a base station, is carried on logical radio channels. A packet switched system based on the GSM system, the GSM GPRS system, makes communication more efficient, since the same logical radio channel can be used by several different mobile subscribers. Data is transmitted only when necessary, and the logical radio channel is not reserved for communication between one mobile station and the base station only. In the system, there is a so-called virtual data transmission connection between the mobile station and the GPRS system. The operating environment of the system is known as such and is widely defined in the ETSI standards, wherein a more detailed description will not be necessary. For using GPRS services, the MS will first log in the network (GPRS attach). The login forms a logical link between the wireless communication device and the serving GPRS support node SGSN.

The trouble-proof operation of the communication network and the efficient utilization of the available resources are only possible, if, for example, in the transmissions by the base stations, the power levels used are as optimal as possible. In addition to this, demands are continuously set for the power consumption of the mobile station itself.

The basic idea of the GPRS system is to apply packet switched resource allocation, wherein resources, e.g. a logical radio channel, are allocated when there is a need to transmit and receive data and information. Thus, the use of available resources can be optimized to be as efficient as possible when compared with e.g. circuit switched GSM technology. The GPRS is designed to support applications which utilize discontinuous data transmission containing, intermittently, even large quantities of data. In the GPRS system, the allocation of channels is flexible, and 1 to 8 time slots of a channel, or 1 to 8 physical channels, can be allocated for each wireless communication device within the scope of a TDMA frame. The term TDMA (Time Division Multiple Access) refers to the allocation of a radio frequency channel into successive time slots on the time level, known as such. The same resources can be allocated to several active mobile stations. U communication (uplink, i.e. communication from the mobile station to the base station) and D communication (downlink, i.e. communication from the base station to the mobile station) can be separately allocated for different users. In each time slot, an information packet with a definite duration is transmitted as a radio frequency burst consisting of a set of modulated bits. The time slots are primarily used as control channels (CCH) and traffic channels (TCH). The traffic channels are primarily used for the transmission of speech and data, and the control channels are used for signalling between the BTS and the MS. One logical control channel is the BCCH (Broadcast Control Channel), which is used for broadcasting detailed information related to the communication network or the cell.

The most significant difference between the GPRS system and the circuit switched GSM system is the packet-based communication. A physical channel, the so-called packet data channel PDCH, is allocated for packet communication in the GPRS system based on a cellular system. The logical channels contained by the PDCH channel (e.g. PCCCH, Packet Common Control Channel) are collected in a frame structure (Multiframe) consisting of repeatedly transmitted 52 TDMA frames (20) which are divided (PCDH/F, Full rate PDCH channel) further into 12 successive blocks (radio blocks), each comprising four frames (TDMA FRAME) as well as four extra frames (IDLE FRAME). The blocks 10 are indicated by blocks B0 to B11, respectively, as shown in FIG. 1. In FIG. 1, the idle frames are also indicated with the reference X. In D communication, these can be used for signalling. The PCCCH channel is used, for example, for calling the MS (PPCH, Packet Paging Channel). In the circuit switched GSM system, the CCCH channel (Common Control Channel) corresponds to this channel. However, the block of the CCCH channel and the preceding block are transmitted on the same power level. Also the BCCH blocks are transmitted on the same channel.

The blocks 10 are further divided into parts, for example headers and control blocks, which contain for example TFI identification. For multiple access in D communication, the TFI identification (Temporary Flow Identifier) is used in the data header to indicate the blocks addressed to a specific given mobile station MS. According to the GPRS system, all the communication devices MS, which are waiting for data transmitted to them on the channel jointly allocated for them, receive all the blocks, interpret the received information and the TFI identification, and select the blocks addressed to them. In the GPRS system, the mobile stations must be continuously ready for packet communication (TBF, Temporary Block Flow), wherein they must quickly shift from a so-called idle mode to a so-called packet transfer mode.

One known technology used in mobile stations for controlling the gain of the receiver is the so-called AGC method (Automatic Gain Control), which has the function of monitoring the effects caused by the mobility and the environment of the MS, for example, on the radio wave in connection with multipath propagation. These include, for example, reflections, frequency dependent drop-outs and attenuations, as well as various slow and fast changes. The signal levels are also changed as a result of BTS power control in D communication. In the invention, in turn, the operation of the AGC is based on monitoring the Rx levels of the received signal, when the MS is in the idle mode and listening to the PCCCH channel. The MS must be capable of monitoring changes in the received downlink signal in order to be able to interpret the information of the block, for example the TFI data, so that the MS can determine whether the block is addressed to it for reception. The aim is to set the gain level of the received analog RF signal before the AD (analog-to-digital) conversion and on a reference level suitable for input in the receiver of the MS. The dynamic range of the receiver (reception window) is typically defined to be restricted above (15 dB) and below (20 dB) a specific reference level. The difference in the power levels between the frames can be as great as 30 dB. Conventionally, in the design of a receiver operating in the GSM system, it has been possible to assume that the signal source, i.e. the base station, is stable on the CCCH channel. Thus, the only function has been to predict the effects of ambient factors.

According to the rules of the ETSI/3GPP specification of the GPRS system, constant power control is used for D communication on PDCH channels, which are used, for example, as PBCCH and PCCCH control channels. Power control refers, for example, to the transmission power level used by the BTS for transmitting a radio signal to the MS. The power level can be lower on the PCCCH than on the BCCH channel (Broadcast Control Channel), the difference (Pb) being indicated on the PBCCH channel. Thus, different frequencies must be allocated for the PCCCH and for the BCCH, because the BCCH frequency always has a constant power level. In the blocks of the other PCDH channels, it is possible to use power control in D communication. The power level is always the same during the bursts (4 bursts) of a single radio block.

In a known manner, two different control modes are used for the power control of the PDCH blocks: Mode A and Mode B. In Mode A, the variation in the output power of the BTS is limited, and the set upper limit must not be exceeded. In Mode B, the total range of variation in the output power is in use, but the power level of the time slot preceding the block must not exceed the power level of the block by more than 10 dB. The power level of the block is changed by a predetermined nominal value (2 dB) at intervals of a maximum of 13 frames (about 60 ms).

In the idle mode according to the circuit switched GSM system of prior art, the AGC can be made on the basis of the signal of the time slot preceding the CCCH block right before the beginning of the CCCH block, because the signal is constant at the whole frequency of the CCCH. Due to the idle mode and the power control in the GPRS system, there is no constant signal available, but the transmission power of the preceding block can be different, because the BTS of the communication network is not expected to use a constant transmission power level. If AGC of the GSM system were used, the receiving window would be incorrectly set. For this reason, the reception of the PCCCH channel would not be successful, which would mean that it would not be possible to answer incoming calls, and packet data transmission would fail.

To be more specific, it should also be mentioned that on the PCCCH channel, only the time slot allocated for this logical channel is transmitted on a constant power level (e.g. TS1). A PBCCH channel can also be present in the time slot in question or in another time slot. For the CCCH channel, in turn, the whole frequency (eight time slots, TS0-TS 7) is transmitted at a constant power level (circuit switched GSM). The logical BCCH channel is always in the same time slot as the CCCH channel (e.g. TS0). In the circuit switched GSM system, time slot TS7 of the preceding radio block is listened to before receiving the blocks of the CCCH channel, because the whole frequency is transmitted at a constant power level. On the basis of this, it has been possible to determine an RSSI estimate for the AGC. According to the invention, and in the packet switched system, in turn, TS1 of the frame of the preceding radio block is listened to, for example frame s1, because other power levels cannot be relied on in the same way as in the circuit switched GSM system.

DISCLOSURE OF INVENTION

The aim of the present invention is to present a new method for eliminating the above-presented problem and for determining a reference value particularly for packet switched data transmission.

The invention is based on the facts to be presented in the following. The signal strength of the PCCCH blocks to be received is monitored, particularly the first burst in the block. On the basis of the monitoring, the AGC is set for the block to be received next, wherein the setting takes place preferably just before the reception of the first burst in the block. The number of PCCCH blocks used for monitoring can be selected. During the monitoring, a reference value is continuously calculated, for example the RSSI value (Received Signal Level Indication). The RSSI value corresponds to the received signal level, so-called Rx level, which is given in units of dBm. The channel profile influences the RSSI values, wherein the monitored RSSI values are averaged to determine a more reliable estimate for the AGC.

In addition to this, according to an embodiment of the invention, the RSSI values of the time slots of the PCCCH block period preceding the PCCCH block to be received are monitored, which has yielded good results. In the monitoring, preferably time slots in the two preceding TDMA frames are used, but the number can be set as a parameter. As an exception if the preceding frame is an idle frame the monitoring is not performed since there is no transmission in the idle frame. The RSSI values of the preceding time slots can be combined to the RSSI values of an earlier received PCCCH block, wherein averaging is used with respect to time, using for example filtering with a running average method. The parameters of the filtering can be selected.

BRIEF DESCRIPTION OF DRAWINGS

The invention will be described with reference to the appended drawings, in which.

MODES FOR CARRYING OUT THE INVENTION

Figure 1:
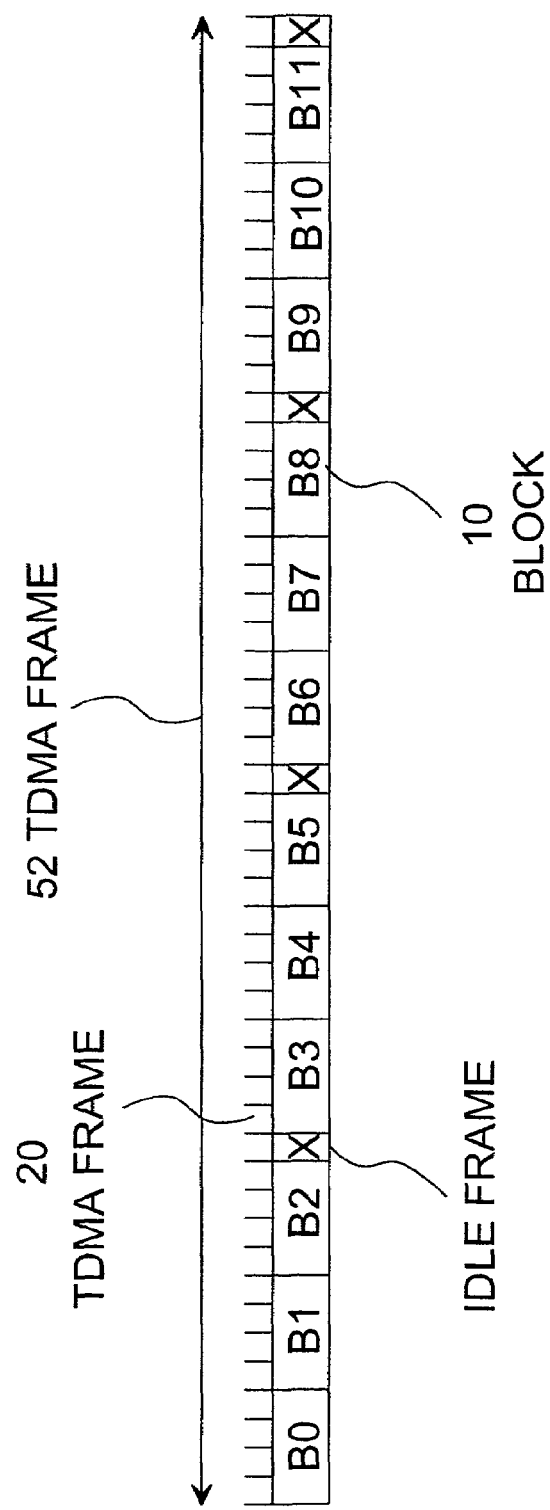
FIG. 1 shows a frame structure of prior art, particularly the frame structure of the GPRS system.
Figure 2:
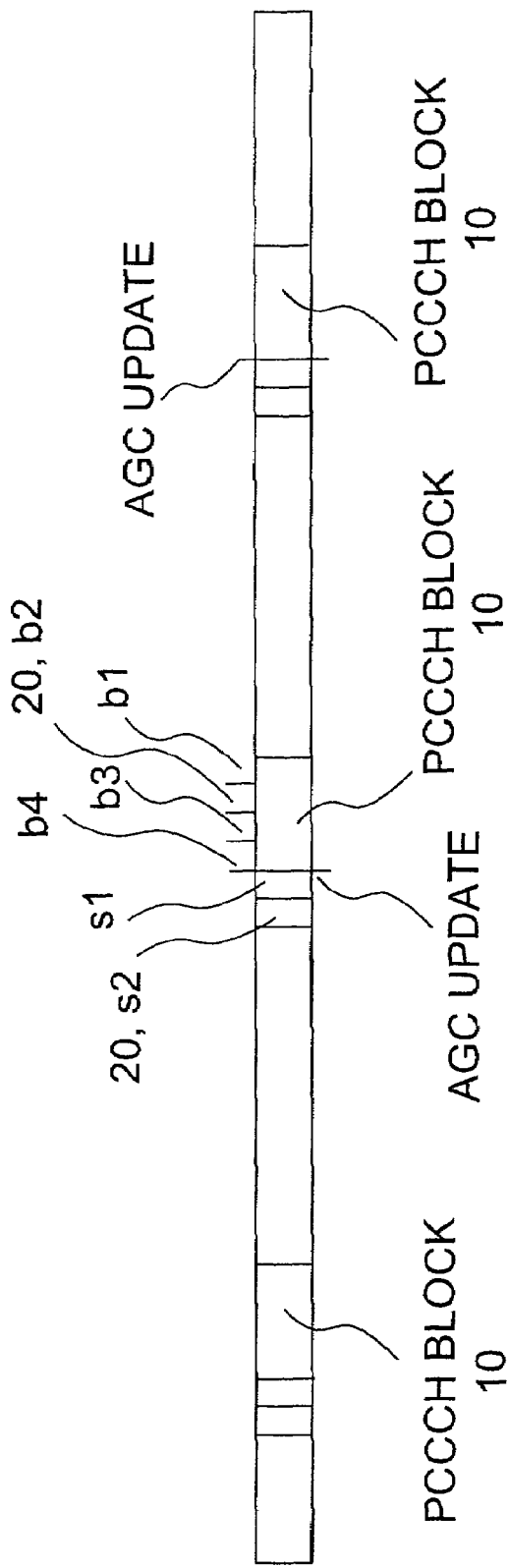
FIG. 2 shows the frame structure and the PCCCH block in use according to the invention.

With reference to FIGS. 1 and 2, the Rx level of the signal received in the GPRS idle mode is estimated on the basis of measurements which are taken on the PCCCH channel (PCCCH time slot, PCCCH BLOCK). The reference Rx level for AGC is updated (AGC UPDATE) just before the reception of a new PCCCH block (PCCCH BLOCK) to be received, and at given periods. The samples used for estimating the Rx level are taken from the preceding block period on PCCCH, which comprises four bursts b1, b2, b3 and b4. In the following, we shall discuss a situation in which one or two measurements are taken from time slots s1 and/or s2 preceding the PCCCH block to be received. More than two preceding bursts can also be used, and they do not need to be successive. In the measurement, several samples of a burst are normally used, their power levels being used for determining the burst power level which is described, for example, with a parameter P(b4). The parameter P(b4) indicates the power level of the burst b4.

The AGC update period can be varied, wherein the update period may comprise several sequences of 52 frames. For example, the update period can be longer: 9×52 frames, i.e. an interval of about 2.15 seconds, or shorter: 4×52 frames, i.e. an interval of about 1 second. Consequently, this corresponds to the frequency of occurrence of the PCCCH block to be received at the time.

According to an embodiment of the invention, the Rx level is calculated according to the following principle (1):

$$RXLEV = (P(b4)+P(b3)+P(b2)+P(b1)+P(s2)+P(s1))/6, \quad (1)$$

in which RXLEV is the Rx level which is calculated as an average of the power levels of all the bursts used for the measurement, the number of the bursts being thus preferably six. The estimate of the Rx level should correspond to the Rx level of the real signal entering the receiver, when receiving the PCCCH block to be received.

In the above formula (1), a factor, for example P(s2), can be missing, or its weight coefficient is set to zero, wherein the average is calculated on the basis of five factors according to the principle (2):

$$RXLEV = (P(b4)+P(b3)+P(b2)+P(b1)+P(s1))/5. \quad (2)$$

According to an embodiment of the invention, the Rx level is calculated according to the following principle (3), in which the results of the bursts of the PCCCH block are weighted:

$$RXLEV = (((P(b4)+P(b3)+P(b2)+P(b1))/4)+((P(s2)+P(s1))/2))/2, \quad (3)$$

in which the Rx level is calculated as an average of the averages. In the above formula (3), a factor, for example P(s2), can be missing, or its weight coefficient is set to zero, wherein the average is calculated by taking this into account. In the formulas (1), (2) and (3), each factor can be weighted with a given weight coefficient, whose value is for example greater or smaller than one.

According to an embodiment of the invention, the Rx level is calculated according to the following principle (4), in which the results of the bursts preceding the PCCCH block are weighted and the measurements of the PCCCH block are ignored (weight coefficient 0):

$$RXLEV = (P(s2)+P(s1))/2, \quad (4)$$

in which the factors P(s1) and P(s2) can also be weighted as desired. According to the invention, the values RXLEV are averaged with respect to time, applying for example a running average and filtering with variable length, whose parameters are changed as desired. The running average is calculated according to the principle (5):

$$RXLEV\_n = (1-a)*(RXLEV\_n-1)+a*RXLEV, \quad (5)$$

in which the RXLEV_n is the running average of the Rx level of the PCCCH after n reference values, a is calculated by the formula 1/PERIOD, in which PERIOD refers to the monitoring period and corresponds to a so-called forgetting factor in the calculation. RXLEV is the new value calculated for the Rx level of the PCCCH. RXLEV_n-1 refers to the preceding calculated value RXLEV_n.

The different alternatives can be compared with each other for example by simulations, wherein it is possible to determine their applicability in various situations and with various parameter values, to make the estimate of the Rx level correspond to the reality as well as possible. Now, it has been found that by monitoring the Rx level of both frames s1 and s2, a good estimate can also be obtained for estimating the real Rx level of the PCCCH block to be received and compared with other principles, particularly with a shorter but not longer update period.

It has also been found that by monitoring the Rx level of both frames s1 and s2 with a longer and a shorter update period, together with the Rx levels of the frames of the PCCCH block to be received, possibly by weighting the frames b1 to b4, a good estimate is obtained when compared with other principles.

The present invention is not limited solely to the above-presented embodiments, but it can be modified within the scope of the appended claims.

The invention claimed is:

1. A method comprising:
   receiving frames of a logical general packet control channel of a radio frequency signal having a varying signal strength as well as frames which have been transmitted with a predetermined transmission power level and by using a predetermined way of controlling the transmission power level,
   determining a reference level for automatic gain control of said signal on the basis of at least one frame of a received radio block, or on the basis of at least one frame of preceding radio blocks, or on the basis of both of these, and correcting the reference level on the basis of the signal strength measured during the reception of said at least one frame,
   correcting the reference level by calculating a running average of the reference level with respect to time, and
   calculating the running average by using a predetermined number of said at least one frames as a forgetting factor.

2. A method according to claim 1, the method further comprising:
   calculating the running average by using filtering with a varying length.

3. A method according to claim 1, the method further comprising:
   selecting, for determining the reference level, one or more frames immediately preceding the received radio block.

4. A method according to claim 3, the method further comprising:
   calculating the reference level as a weighted or unweighted average of the signal strength of several frames.

5. A method according to claim 1, the method further comprising:

selecting, for determining the reference level, one or more frames of the received radio block.

6. A method according to claim 5, the method further comprising:
calculating the reference level as a weighted or unweighted average of the signal strength of several frames.

7. A method according to claim 1, the method further comprising:
determining the signal strength by using samples measured from the radio frequency signal.

8. A method according to claim 1, wherein said logical general packet control channel is the packet common control channel of the general packet radio service network.

9. A method according to claim 1, wherein said predetermined way is constant power control used by the general packet radio service network in downlink data transmission, power control according to mode A, or power control according to mode B.

10. A method according to claim 1, the method further comprising:
selecting, for determining the reference level, one or more frames immediately preceding the received radio block.

11. A method according to claim 10, the method further comprising:
calculating the reference level as a weighted or unweighted average of the signal strength of several frames.

12. A method according to claim 1, the method further comprising:
using a wireless communication unit to receive said radio block and said frames transmitted by a base transceiver station of a packet switched communication network based on a cellular system.

13. A method according to claim 12, the method further comprising:
measuring the signal strength of the radio frequency signal received in said wireless communication unit, the radio frequency signal being analog, and correcting the signal gain on the basis of the determined reference level at predetermined intervals.

14. A device comprising:
means for receiving frames of a radio block of a logical general packet control channel of a radio frequency signal having a varying signal strength as well as frames preceding said radio block, which have been transmitted with a predetermined transmission power level and by using a predetermined way of controlling the transmission power level,
means for determining a reference level for automatic gain control of said signal on the basis of at least one frame of a received radio block, or on the basis of at least one frame of preceding radio blocks, or on the basis of both of these, the device being configured to correct the reference level on the basis of the signal strength measured during the reception of said at least one frame, to correct the reference level by calculating a running average of the reference level with respect to time, and to calculate the running average by using a predetermined number of said at least one frames as a forgetting factor.

15. A device according to claim 14, wherein said device is a wireless communication unit operating in the general packet radio service network.

16. A device according to claim 14, wherein the device is a wireless communication unit arranged to receive said radio block and said frames transmitted by a base transceiver station of a packet switched communication network based on a cellular system.

17. A device according to claim 14, wherein the device further comprises:
means for measuring the signal strength of the radio frequency signal received in said wireless communication unit, said radio frequency signal being analog, and
means for correcting the signal gain on the basis of the determined reference level at predetermined intervals.

18. A device, comprising:
means for receiving frames of a radio block of a logical general packet control channel of a radio frequency signal having a varying signal strength as well as frames preceding said radio block, which have been transmitted with a predetermined transmission power level and by using a predetermined way of controlling the transmission power level, wherein the device is a wireless communication unit arranged to receive said radio block and said frames transmitted by a base transceiver station of a packet switched communication network based on a cellular system, and
means for determining a reference level for automatic gain control of said signal on the basis of at least one frame of a immediately preceding the received radio block, or on the basis of at least one frame preceding the received radio block, or on the basis of both of these, the device being configured to correct the reference level on the basis of the signal strength measured during the reception of said frames, wherein the device is configured to calculate the reference level as a weighted or unweighted average of the signal strength of several frames.

19. A device, comprising:
means for receiving frames of a radio block of a logical general packet control channel of a radio frequency signal having a varying signal strength as well as frames preceding said radio block, which have been transmitted with a predetermined transmission power level and by using a predetermined way of controlling the transmission power level, wherein the device is a wireless communication unit arranged to receive said radio block and said frames transmitted by a base transceiver station of a packet switched communication network based on a cellular system, and
means for determining a reference level for automatic gain control of said signal on the basis of at least one frame of a immediately preceding the received radio block, or on the basis of at least one frame preceding the received radio block, or on the basis of both of these, the device being configured to correct the reference level on the basis of the signal strength measured during the reception of said frames, wherein the device is configured to calculate the running average by using filtering with a varying length.

20. A method comprising:
receiving frames of a logical general packet control channel of a radio frequency signal having a varying signal strength as well as frames which have been transmitted with a predetermined transmission power level and by using a predetermined way of controlling the transmission power level, and
determining a reference level for automatic gain control of said signal on the basis of at least one frame immediately preceding a received radio block, and correcting the reference level on the basis of the signal strength measured during the reception of said at least one frame, the method further comprising:

calculating the reference level as a weighted or unweighted average of the signal strength of several frames.

21. A method comprising:

receiving frames of a logical general packet control channel of a radio frequency signal having a varying signal strength as well as frames which have been transmitted with a predetermined transmission power level and by using a predetermined way of controlling the transmission power level, and determining a reference level for automatic gain control of said signal on the basis of at least one frame immediately preceding a received radio block, and correcting the reference level on the basis of the signal strength measured during the reception of said at least one frame, the method further comprising:

calculating the running average by using filtering with a varying length.

* * * * *